United States Patent
Aldridge et al.

(10) Patent No.: US 10,960,543 B2
(45) Date of Patent: Mar. 30, 2021

(54) ROBOTIC POINT CAPTURE AND MOTION CONTROL

(71) Applicant: SISU DEVICES LLC, Round Rock, TX (US)

(72) Inventors: Russell Aldridge, Austin, TX (US); Marc Christenson, Austin, TX (US); Isaac Jones, Round Rock, TX (US); Jacob Robinson, Round Rock, TX (US)

(73) Assignee: Sisu Devices, LLC, Round Rock, TX (US)

( * ) Notice: Subject to any disclaimer, the term of this patent is extended or adjusted under 35 U.S.C. 154(b) by 315 days.

(21) Appl. No.: 15/993,401

(22) Filed: May 30, 2018

(65) Prior Publication Data

US 2018/0345495 A1 Dec. 6, 2018

Related U.S. Application Data

(60) Provisional application No. 62/512,677, filed on May 30, 2017.

(51) Int. Cl.

| | |
|---|---|
| *B25J 9/16* | (2006.01) |
| *B25J 9/00* | (2006.01) |
| *B25J 13/02* | (2006.01) |
| *B25J 15/00* | (2006.01) |
| *B25J 13/06* | (2006.01) |

(52) U.S. Cl.
CPC ........... *B25J 9/1669* (2013.01); *B25J 9/0081* (2013.01); *B25J 9/1658* (2013.01); *B25J 9/1661* (2013.01); *B25J 9/1664* (2013.01); *B25J 13/02* (2013.01); *B25J 13/065* (2013.01); *B25J 15/0066* (2013.01)

(58) Field of Classification Search
None
See application file for complete search history.

(56) References Cited

U.S. PATENT DOCUMENTS

| | | | | |
|---|---|---|---|---|
| 5,617,515 | A * | 4/1997 | MacLaren | B25J 9/1656 414/5 |
| 6,019,606 | A * | 2/2000 | Yamamoto | G05B 19/427 434/45 |
| 8,051,468 | B2 * | 11/2011 | Davis | G06F 21/316 726/5 |
| 8,121,731 | B2 * | 2/2012 | Ban | G05B 19/425 700/254 |

(Continued)

*Primary Examiner* — Bhavesh V Amin
(74) *Attorney, Agent, or Firm* — Eversheds Sutherland (US) LLP

(57) ABSTRACT

This disclosure describes systems, methods, and devices related to robotic point capture and motion control. A robotic device may synchronize one or more robotic device axes with one or more axes of a handheld control device. The robotic device may establish a connection between a robotic device and the handheld control device, wherein the robotic device is capable of moving along the one or more robotic device axes. The robotic device may receive a control signal comprising an indication to transition to a point in space along travel path, wherein the travel path is based on information relating to one or more locations and one or more orientations of the handheld control device. The robotic device may cause to transition an end effector of the robotic device to the point in space based on the indication in the control signal.

16 Claims, 8 Drawing Sheets

(56) References Cited

U.S. PATENT DOCUMENTS

| | | | | |
|---|---|---|---|---|
| 8,412,379 | B2* | 4/2013 | Gerio | G05B 19/425 |
| | | | | 700/264 |
| 8,695,086 | B2* | 4/2014 | Davis | G06F 21/32 |
| | | | | 726/19 |
| 8,781,629 | B2* | 7/2014 | Ota | B25J 9/1671 |
| | | | | 700/259 |
| 9,138,893 | B2* | 9/2015 | Nagai | G05B 19/425 |
| 9,925,662 | B1* | 3/2018 | Jules | G05B 19/423 |
| 10,166,673 | B2* | 1/2019 | Orman | G06F 3/04883 |
| 10,754,307 | B2* | 8/2020 | Fujita | G05B 19/406 |
| 2007/0213873 | A1* | 9/2007 | Ban | G05B 19/425 |
| | | | | 700/245 |
| 2008/0092209 | A1* | 4/2008 | Davis | G06F 21/316 |
| | | | | 726/2 |
| 2010/0145520 | A1* | 6/2010 | Gerio | G05B 19/425 |
| | | | | 700/264 |
| 2010/0153061 | A1* | 6/2010 | Hietmann | G01S 5/163 |
| | | | | 702/152 |
| 2011/0060462 | A1* | 3/2011 | Aurnhammer | B25J 9/1674 |
| | | | | 700/255 |
| 2011/0321157 | A1* | 12/2011 | Davis | G06F 21/316 |
| | | | | 726/19 |
| 2016/0346921 | A1* | 12/2016 | Orman | B25J 13/088 |
| 2018/0046152 | A1* | 2/2018 | Fujita | G05B 19/423 |

\* cited by examiner

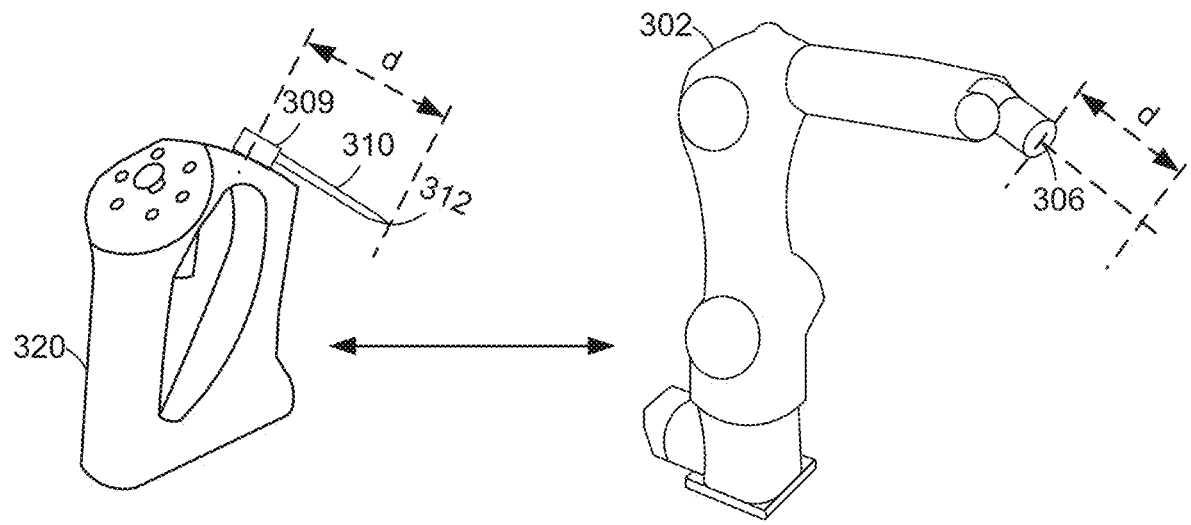
FIG. 3A
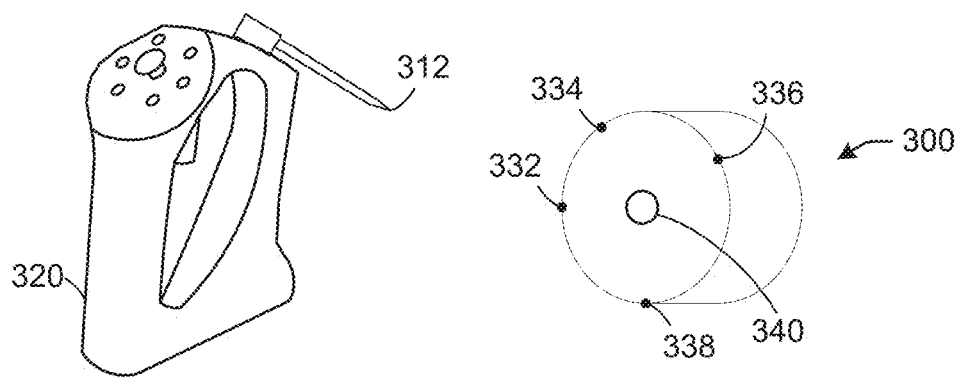
FIG. 3B
FIGs. 3A-3B

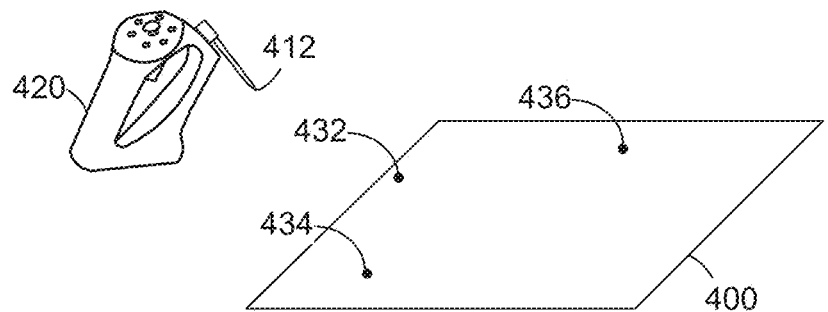
FIG. 4A
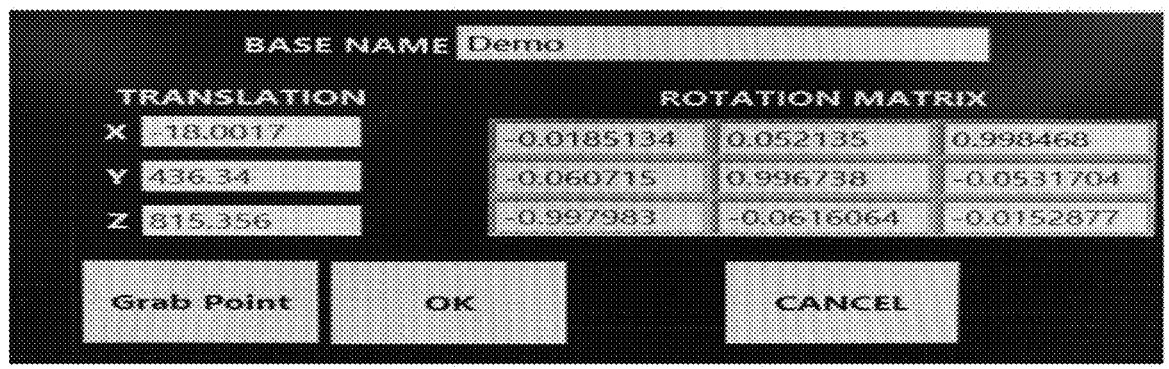
FIG. 4B
FIGs. 4A-4B ns set forth in the claims encompass all available equivalents of those claims.

ROBOTIC POINT CAPTURE AND MOTION CONTROL

CROSS-REFERENCE TO RELATED APPLICATIONS

This application claims benefit of U.S. Provisional Application No. 62/512,677, filed May 30, 2017, the disclosure of which is incorporated herein by reference as if set forth in full.

TECHNICAL FIELD

This disclosure generally relates to systems, methods, and devices for robotic motion technologies and, more particularly, for robotic point capture and motion control.

BACKGROUND

In general, robotic devices consist of multiple axes of motion, allowing robotic control of position and orientation in space. Multi-axis robotic devices are capable of moving within a given number of dimensions in space, allowing points in space to be captured and programmed, which allows a robotic device to move and behave in a certain way. For example, a robotic device having six degrees of freedom (DOF) is capable of a full range of orientations and positions within a given space.

BRIEF DESCRIPTION OF THE DRAWINGS

FIGS. 3A and 3B depict a robotic point capture and motion control system, in accordance with one or more example embodiments of the present disclosure.

FIGS. 4A and 4B depict a robotic point capture and motion control system, in accordance with one or more example embodiments of the present disclosure.

DETAILED DESCRIPTION

Figure 1:
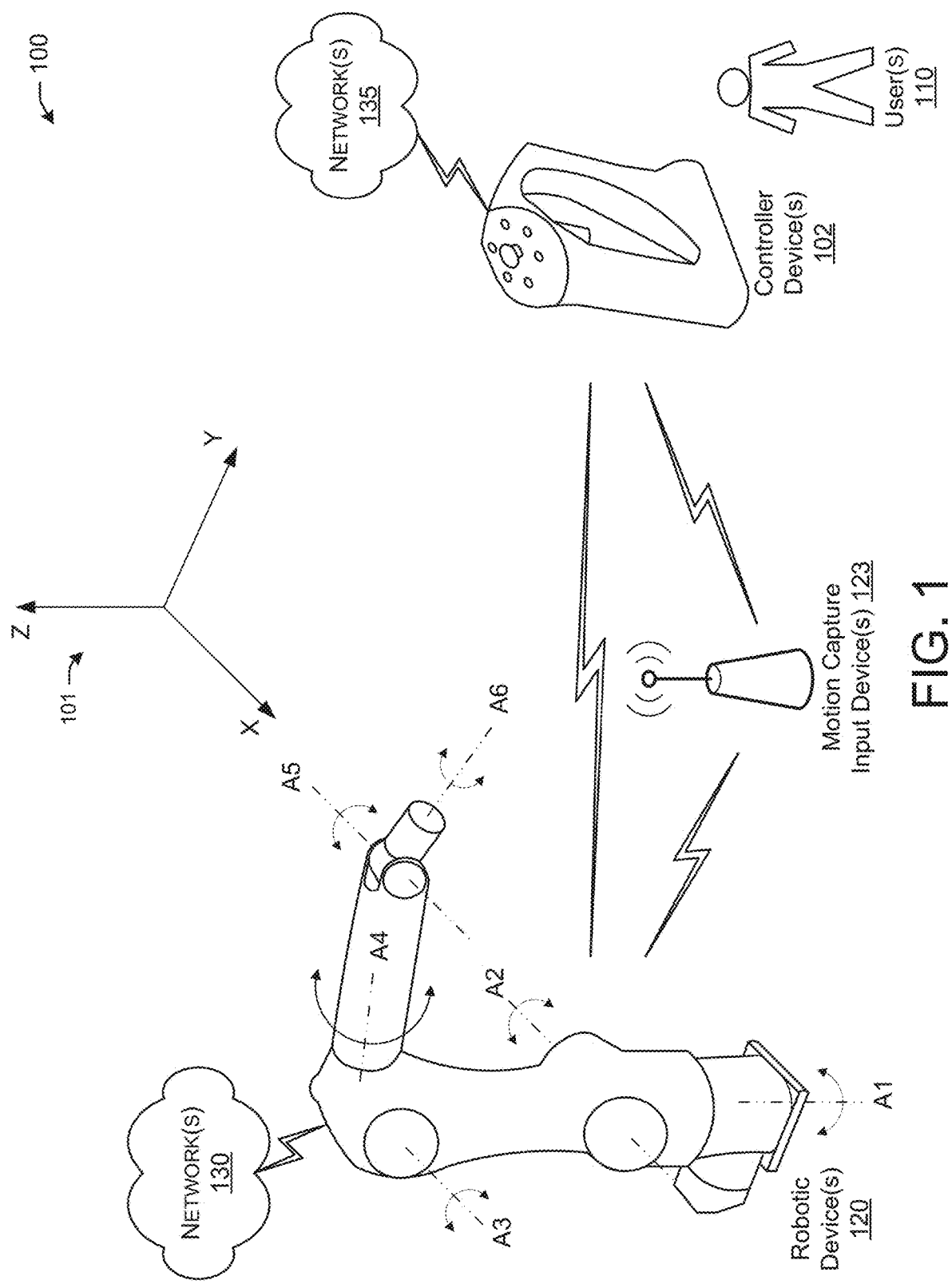
FIG. 1 depicts a diagram illustrating an example network environment of an illustrative robotic point capture and motion control system, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Robotic devices consisting of multiple axes of motion may allow robotic control of position and orientation in space. Programming the positions of these axes may be done manually, assigning angular or linear values to each axis and building a sequence of points to accomplish a given task. Programming can also be accomplished by mapping the axes to a coordinate system, allowing the inverse kinematics of the motion system to control the axes. This is useful particularly for robotic arms and provides for a Cartesian coordinate system to be used in place of a difficult to navigate angular axis coordinate system.

Acquisition of these data points, whether in angular form or in Cartesian coordinate form, is accomplished through a button and touchscreen interface, or using a three-dimensional mouse. In the case of the button and touchscreen interface, individual axes or directions in the Cartesian space are navigated by jogging the robot in different directions by holding a button. A more responsive interface is achieved in the case of the three-dimensional mouse, which captures the relative positional and angular shift of a floating button, allowing the user to jog the robot in a given direction or orientation in a Cartesian coordinate system.

While robust, these interfaces are typically slow and difficult to use. Navigating to different points often requires switching between different modes and ranges of operation, resulting in slow point acquisition. The movements generated by these control systems are also not intuitive, increasing the risk of user error and machine damage.

Robotic devices offer high precision and rapid speeds, but must be controlled in such a way that takes advantage of these qualities while compensating for the large inertia. For example, heavy-duty industrial robotic arms may have inherently large inertia. Some controllers offer a simple way to generate endpoint motions, but suffer from slow settling times and inefficient motions consisting of high initial forces and low final forces.

Robotic applications require the operator to "teach", "program", or "capture" 3-dimensional points that serve as target points for robot motion. Typically, the robot must be moved to the specified location and orientation to capture the desired point. This often means the operator must move the robot into a gross position and then make very slow, fine moves, to bring the robot into the exact orientation desired.

Example embodiments of the present disclosure relate to systems, methods, and devices for robotic point capture and motion control.

In one embodiment, a robotic point capture and motion control system may enable the capturing of one or more points in space associated with a handheld controller device without having to move the robot to one or more points in space during programming.

In one embodiment, the robotic point capture and motion control system may include a wireless controller device or a wired controller device (e.g., a handheld device) communicating the position and the orientation data to a motion capture input device. The motion capture input device maps the local orientation and position data into a coordinate system aligned with the robot or motion control system of the robot. The motion control system of the robot may comprise multiple axes of motion, controlled through a Cartesian coordinate system through an inverse kinematics mapping in one embodiment, or with each axis of motion controlled directly with no transformation mapping in another embodiment. Motion data from the controller device is transmitted to motion system associated with the robot through a robot communication interface. This interface can be any wired or wireless communication protocol used to send and receive motion information from the robot. In one embodiment, the robot communication protocol may be a UDP message sent from the robot to the motion capture input device, with an expected reply containing the next required position to move to.

In one embodiment, a robotic point capture and motion control system may facilitate controlling the robot motion based on a hand gesture while holding the controller device. For example, a user may hold the controller device and may move his or her hand such that the robot moves in the same direction as the hand gesture. That is, the robot may follow the controller device's movement direction regardless of the controller device's orientation and with a speed that is proportional to the amount of force applied to the trigger. This allows the user to program the robot very quickly and intuitively. For example, as the handheld controller device traverses a path in space, it sends at a predetermined time interval information including the handheld controller device coordinates to the motion capture input device.

Programming a robot is usually accomplished using a "teach pendant" connected to the robot to slowly move the robot in one direction or one axis at a time. This means that users must stay in the same position or readjust in their minds how the robot will move when they press certain buttons. The pendant usually contains fixed buttons, soft buttons with a fixed personality, and/or a 3D "space-ball" that allows for control of the robot in a fixed frame of reference. This controller may allow for translation of the end effector in multiple directions at once (XYZ), but does not allow for articulation of the end effector at the same time unless individual axes are controlled one at a time. The motion is not intuitive and is very time consuming. The user must often stop and switch between different modes of robot control.

Although there are methods available for capturing 3D points in space, these methods have not been applied to the field of industrial robotics to align the robot, create safe spaces, or guide the robot in 3D space without moving the robot. Some examples of points in space include points that define 3D planes to define safety boundaries such that the robot does not move past a specified boundary to prevent operator injury or equipment damage), or points on a tool or work piece with which the robot must interact. The boundary apply not only to the end effector of the robot, but also to other parts of the robot. These parts of the robot should not breach the safety barriers. Some simulation tools exist which allow the robot to be moved in 3D space from a CAD/CAM program, but a tool for marking points in space using a physical controller does not exist.

In one embodiment, a robotic point capture and motion control system may facilitate a single point and orientation capture in 3D space using a handheld controller and touch probe. The touch probe may allow capturing of one or more points and orientations in the 3D space. The touch probe and hand controller could be the same piece, or separate pieces that could be connected together. In one embodiment, the touch probe may be attached to the hand controller to be similar to the robot end effectors. This is useful for teaching the robot without moving the robot. For example, if the end effector of the robot is an attachment that includes a gripper, the touch probe on the controller device may also be a gripper that may be used by a user to capture one or more points and orientations in the 3D space. These captured points and orientations may then be used to program the robot. The robot may then perform the actions that were programmed using the controller device and the touch probe.

In one embodiment, a robotic point capture and motion control system may facilitate the creation of one or more planes, points, or axes based at least in part on capturing of points and orientations in 3D space using the handheld controller and the touch probe.

In one embodiment, a robotic point capture and motion control system may instantaneously align a robot to planes or axes defined by the controller point capture.

In one embodiment, a robotic point capture and motion control system may facilitate the ability to prevent a robot from moving past "keepout" planes or regions, which are defined using planes, captured above. Keepouts could apply to the end effector, other parts of the robot, or both. Adding "keepout areas" by defining those areas in the real world via a position recording device allows for the robot programmer to not hit any objects while programming. This feature, is not available in any other robot programming methods.

In one embodiment, a robotic point capture and motion control system may use one or more methods of position and orientation capture. For example, the robotic point capture and motion control system may "fuse" together one or more technologies to overcome weaknesses faced by other technologies. For example, optical techniques may provide higher accuracy than magnetic ones, but optical techniques are limited to line of sight operations. The robotic point capture and motion control system may use magnetic, optical, inertial measurement units (IMUs), and other techniques for capturing position and orientation in a robotic application concurrently and/or simultaneously. In some examples, tracking dots, or a "puck" with LED's may be placed on the handheld controller and on the end effector of the robot. The cameras track both objects and are able to understand the location and orientation of the objects in space. This allows robotic point capture and motion control system to get sub-millimeter precision.

In one embodiment, a robotic point capture and motion control system may facilitate a robot teaching using a robot orientation and path planning by selecting individual points in free space using the controller. In play mode, the robot may traverse from point to point based on the captured orientation and path. The robot can come to rest at one point, or follow points as portions of a spline. The advantage is that the operator may teach entire paths or portions of paths without moving the robot. An example may be selecting individual points along a welding path.

In one embodiment, a robotic point capture and motion control system may facilitate robot teaching using a robot orientation and path planning by "recording" a path in free space using the controller. In play mode, the robot may follow this path as a complete spline. An example may be teaching the robot how to spray paint a car.

In one embodiment, a robotic point capture and motion control system may facilitate the ability to "call" the robot to a specific position based on a single position and orientation reading from the hand-held controller. The user may select the position in free space, moves out of the way, and then initiates the robot's move to the selected position by modulating the speed with the trigger on the controller. That is the user may make the robot move from slow to fast based on gently pressing the trigger to firmly pressing the trigger.

In one embodiment, a robotic point capture and motion control system may visually illustrate the points of a robot program on a user interface by showing a 3D image of the robot moving to each point as the user scrolls through points. The point path may also be shown as a spline.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment of an illustrative robotic point capture and motion control system, in accordance with one or more example embodiments of the present disclosure. The network environment 100 may include robotic device(s) 120 and one or more controller devices 102, which may communicate in accordance with, and be compliant with, various communication standards and protocols, such as optical mechanisms, magnetic mechanisms, Wi-Fi, user datagram protocol (UDP), time sensitive network (TSN), wireless USB, Wi-Fi peer-to-peer (P2P), Bluetooth, near field communication (NFC), or any other communication standard.

Figure 6:
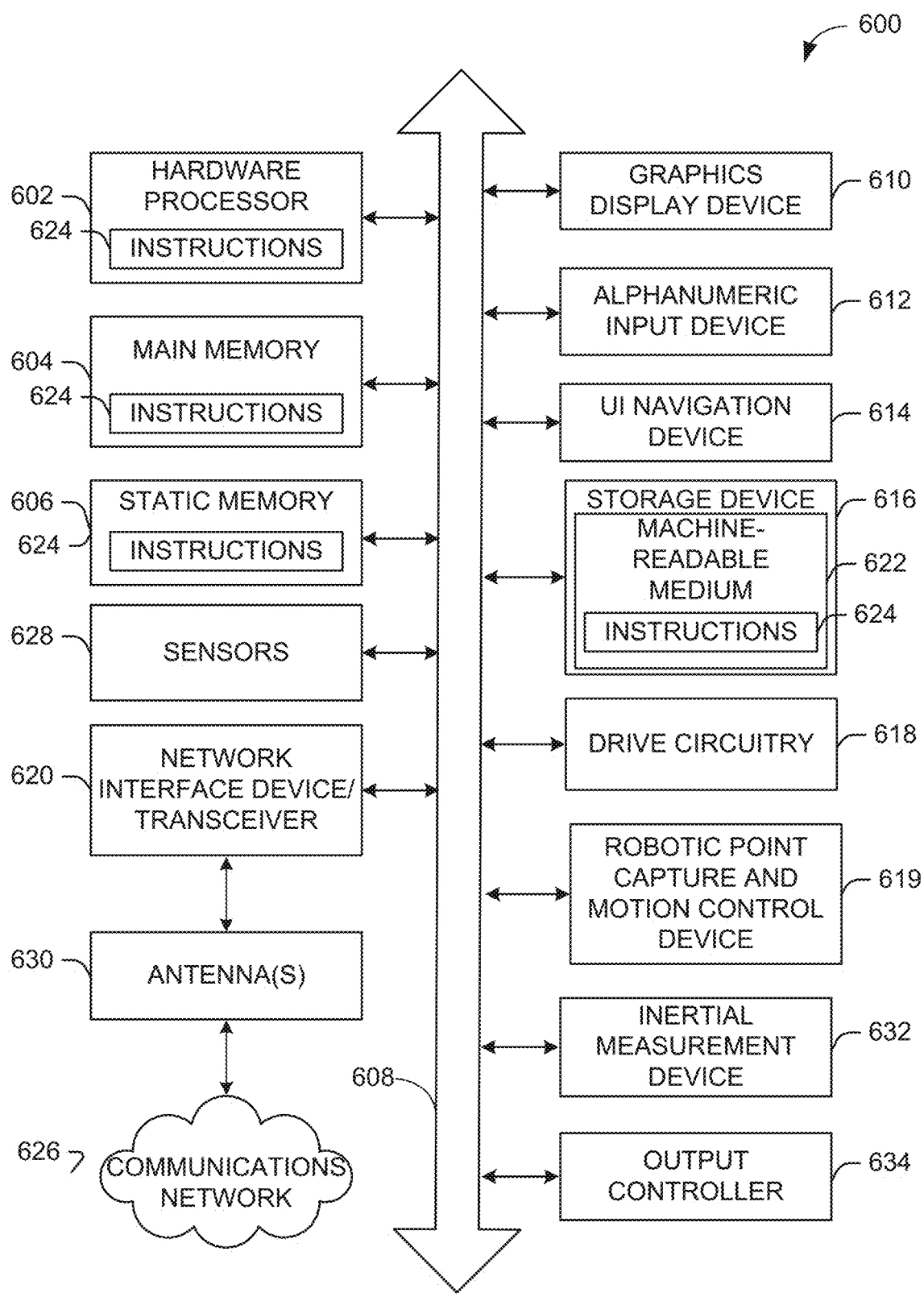
FIG. 6 depicts a block diagram of an example robotic machine upon which any of one or more techniques (e.g., methods) may be performed, in accordance with one or more example embodiments of the present disclosure.

In some embodiments, a robotic device 120, one or more motion capture input devices 123, and a controller device 102 may include one or more computer systems similar to that of the example machine/system of FIG. 6.

In one embodiment, and with reference to FIG. 1, a robotic device 120 may communicate directly with the controller device 102. For example, the two devices may communicate through a wired or a wireless connection (e.g., magnetic, optical, wireless technology based communication, cables, etc.). In other examples, the two devices may communicate through a motion capture input device 123, where the motion capture input device 123 may act as a base station. In some scenarios, the robotic device 120 and the controller device 102 may communicate through various networks (e.g., network 130 and/or network 135). In some scenarios, the motion capture input device 123 may be part of the robotic device 120.

The robotic device 120 may have various applications. For example, the robotic device 120 may be configured as an industrial robot, an aerospace application, an automation tool, welding, painting, or any other applications.

In one embodiment, a robotic point capture and motion control system may use one or more methods of position and orientation capture. For example, the robotic point capture and motion control system may "fuse" together one or more technologies to overcome weaknesses faced by other technologies. For example, optical techniques may provide higher accuracy than magnetic ones, but optical techniques are limited to line of sight operations. The robotic point capture and motion control system may use magnetic, optical, inertial measurement units (IMUs), and other techniques for capturing position and orientation in a robotic application concurrently and/or simultaneously. For example, optical techniques may be used in situations where line of sight is not limited, while other techniques such as magnetic or wireless may be used when line of sight is limited. A determination may be made by the controller device and the base station (e.g., motion capture input device 123) based on thresholds. For example, a controller device may emit light through one or more LED emitters towards the base station. The base station may then perform analysis on the received light signals from the one or more LED emitters. The base station may contain an optical received signal strength indicator (RSSI) circuit that may be used to determine the strength of the received light signal(s).

In the scenario for using optical technology for the robotic point capture and motion control system, the robotic point capture and motion control system may comprise one or more cameras and one or more LED emitters that may be incorporated with the components of the robotic point capture and motion control system. For example, the controller device may comprise one or more LED emitters that may be sent to a base station that comprises cameras. The base station cameras may capture the light signals emitted by the LED emitters and may translate the light signals into information and data that may be used by the base station to control a robot. For example, the controller device may encode the data associated with its position and orientation as it is being held by a user. The encoded data may encapsulated and sent through one or more LED emitters as light signals to the base station. The base station cameras receiving these light signals will decode and extract the data that was sent as light signals from the controller device. This data may be captured and saved in a storage unit on the base station.

In some examples, tracking dots, or a "puck" with LED's may be placed on the handheld controller and on the end effector of the robot. The cameras track both objects and are able to understand the location and orientation of the objects in space. This allows robotic point capture and motion control system to get sub-millimeter precision.

The controller device 102 may be a handheld device, such as a joystick, which may be used as a form of motion input. The vector of joystick motion may be mapped to a plane intersecting the controller device 102, and corresponding global position vectors are applied to the robotic device 120.

The controller device 102 may control the robotic device 120 by transmitting control signals to the robotic device 120 through a wire or through wireless signals and vice versa. For example, the controller device 102 may send the control signal as an Ethernet packet through an Ethernet connection (e.g., an EtherCAT bus) to the robotic device 120.

The motion capture input device 123 may be a stand-alone device, or may be included in the robotic device 120. The controller device 102 may communicate its position and orientation data to the motion capture input device 123. This maps the local orientation and position data into a coordinate system aligned (e.g., synchronized) with the robot's motion control system. The motion control system of the robot may comprise multiple axes of motion, controlled through a Cartesian coordinate system through an inverse kinematics mapping in one embodiment, or with each axis of motion controlled directly with no transformation mapping in another embodiment. Motion data from the controller device is transmitted to motion system associated with the robot through a robot communication interface. This interface can be any wired or wireless communication protocol used to send and receive motion information from the robot. In one embodiment, the robot communication protocol may be a UDP message sent from the robot to the motion capture input device 123, with an expected reply containing the next required position to move to. The motion capture input device 123 emits an alternating magnetic field, which is sensed by the controller (102). The field can be either a direct field or alternating field. Multiple motion capture input devices 123 could be used to increase accuracy or reduce interference.

The controller device 102 and the robotic device 120 may communicate using a robot communication protocol such as a user datagram protocol (UDP). A UDP message may be sent from the robotic device 120 to the controller device 102 or vice versa. A reply to the UDP message may contain a next position or a new position that the robotic device 120 will move to.

The controller device 102 may also contain haptic feedback devices to provide vibration for certain events, like adding a point, or to communicate robot inertia to the hand of the operator. This may be applicable to a "spray paint" mode to help the operator understand on the fly the kinds of accelerations they are "asking" the robot to do while the robot is being taught. There could also be feedback that tells the user when they have gone outside the reach or possible orientation of the robot before they add a point the robot could not possibly get to. The controller device 102 could also have a light or a display that communicates information to the user. For example, the control device 102 may the couple to a user display that may provide a user interface to display information associated with the controller device and the robotic device. A user may interact with the user interface in order to modify, add, save, or delete any of the information.

The robotic device 120 may receive the control signal and may be controlled by the received control signal. The control signal may be received directly from the controller device 102, or may be received through the motion capture input device 123. For example, the control signal may cause the robotic device 120 to apply or remove pneumatic air from a robotic gripper of the robotic device 120, or any kind of input/output or generic gripper or any device to communicate to on the robot. Further, the control signal may cause the robotic device 120 to move to a new position in space. When the robotic device 120 receives the control signal, new state information is applied, and any needed motion to the new position may be executed. The robotic device 120 may also transmit a signal indicating its status to the controller device 102, which may happen directly between the controller device 102 and the robotic device 120 or through the motion capture input device 123. The robotic device 120 may be configured to rotate along rotation axes of motion. The robotic device 120 consisting of these rotation axes of motion may allow control of the position and orientation in space. For example, the robotic device 120 may have six degrees of freedom resulting in a full range of orientations and positions within a given space. Programming the positions of these rotation axes may be done manually, by assigning angular or linear values to each axis and building a sequence of points to accomplish a given task. Programming can also be accomplished by mapping the axes to a coordinate system (e.g., coordinate system 101), allowing the inverse kinematics of the motion system to control the axes. This is useful particularly for robotic arms and provides for a Cartesian coordinate system to be used in place of a difficult to navigate angular axis coordinate system.

It should be understood that the six degrees of freedom is used here, this is only for illustration purposes and that the robotic point capture and motion control system could apply to robotic device with any number of degrees freedom. For example, seven axis collaborative robots, as well as SCARA robots or even XYZ gantries. Further, it may be conceivable that the robotic point capture and motion control system may apply outside the realm of industrial robotics. For example, to manipulate a drone or a humanoid robot.

In the example of FIG. 1, the robotic device 120 may be configured to have six rotation axes, A1, A2, A3, A4, A5, and A6. Each of the rotation axes A1, A2, A3, A4, A5, and A6 is able to allow a section of the robotic device associated with that axis to rotate around that axis. When all of the angles of the rotation axes A1, A2, A3, A4, A5, and A6 are determined, the entire status of the robotic device 120 may be determined.

In one embodiment, the controller device 102 and the robotic device 120 may utilize a synchronized coordinate system (e.g., coordinate system 101) that facilitates mapping all of the rotation axes A1, A2, A3, A4, A5, and A6 to the coordinate system 101. Moving the controller device 102 along at least one of the axes of the coordinate system 101 may control the angles of the rotation axes A1, A2, A3, A4, A5, and A6 of the robotic device 120 according to the position, orientation, and movement of the controller device 102. That is, a user 110 may be able to manipulate the position, orientation, and movement of the controller device 102 and, as a result, manipulating the position, orientation, and movement of the robotic device 120. The position, orientation, and movement of the controller device 102 may be translated into instructions that may be used in one or more control signals to control the robotic device 120. Ultimately, these instructions may control the angles of the rotation axes A1, A2, A3, A4, A5, and A6, in order to perform a certain action or to move the robotic device 120 to a new position in space.

In other words, the robotic device can be "locked" so that it only moves in a single coordinate frame 101. It can also be locked so that it only moves in relation to the coordinate system defined by the end effector axis A6. It can also be setup so that it moves only along any arbitrary axis or moves in relation to an offset from a plane. It can also be defined so that the end effector rotates or articulates around some point in space.

Figure 2A:
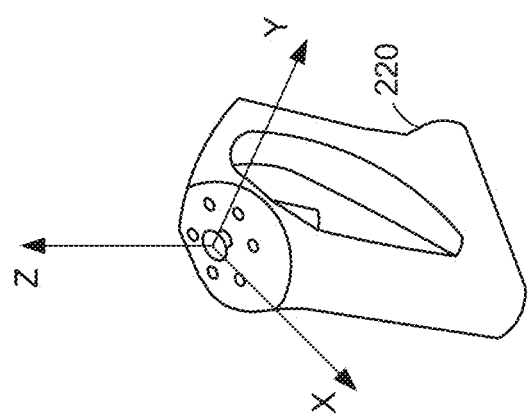
FIGS. 2A and 2B depict illustrative schematic diagrams of a robotic point capture and motion control system, in accordance with one or more example embodiments of the present disclosure.
Figure 2A:
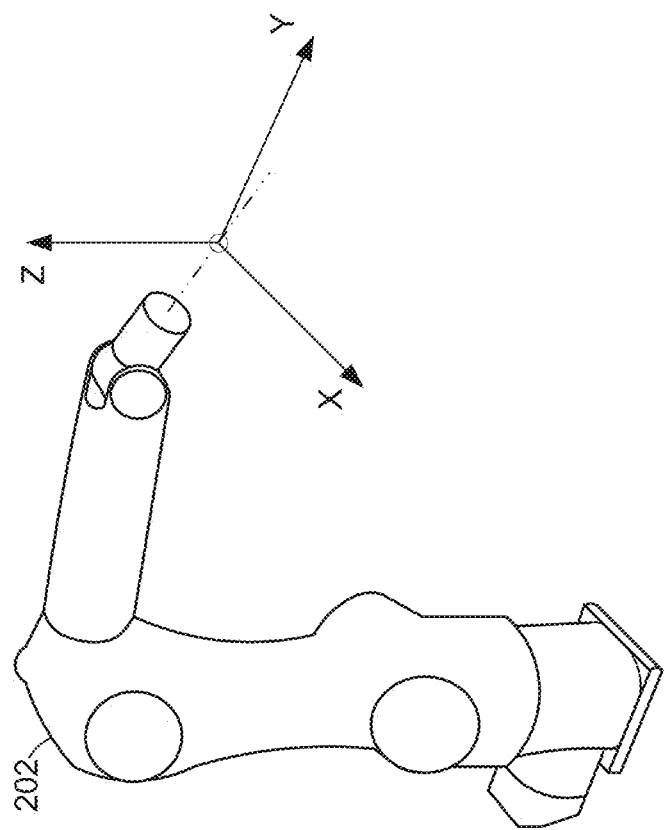
Figure 2B:
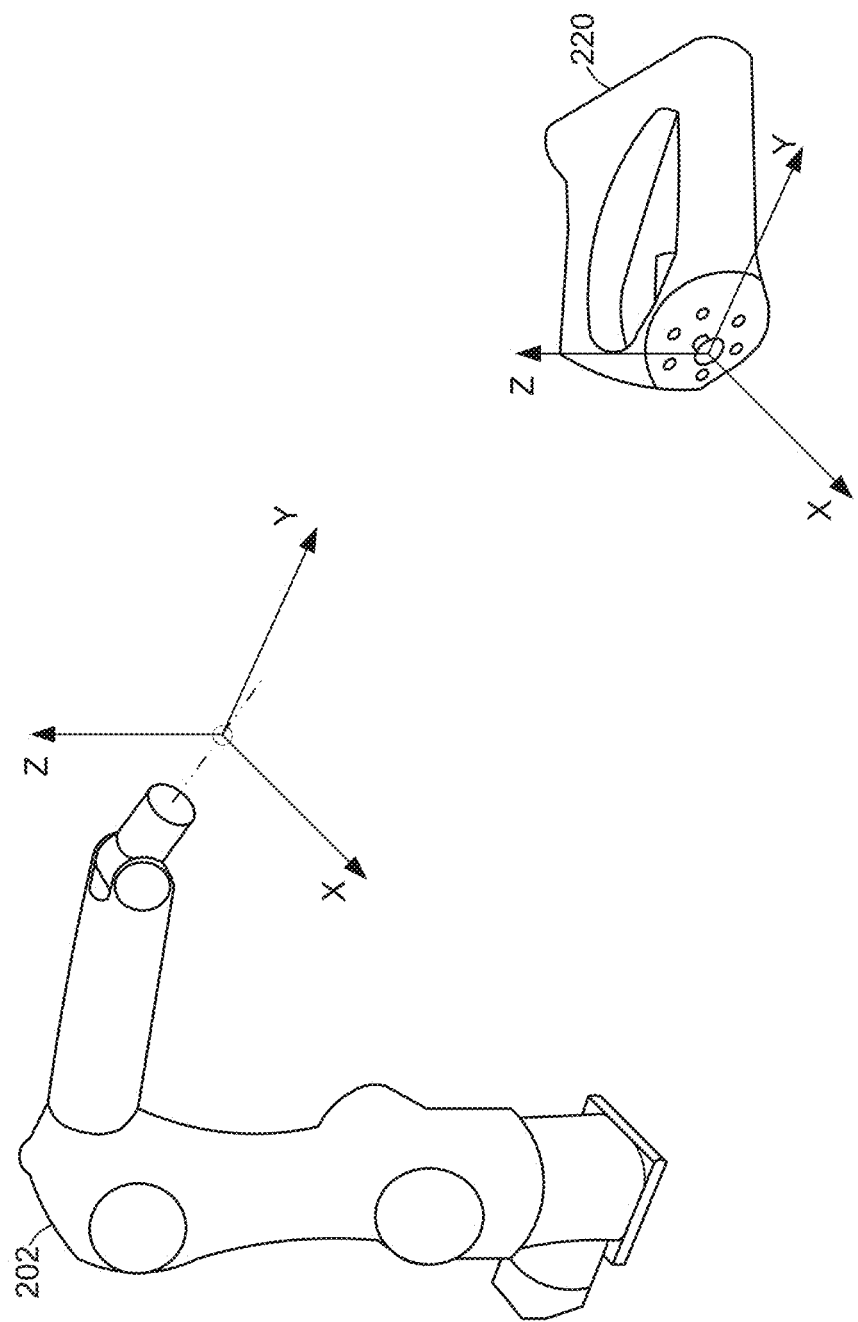

FIGS. 2A and 2B depict illustrative schematic diagrams of a robotic point capture and motion control system, in accordance with one or more example embodiments of the present disclosure.

Referring to FIG. 2A, there is shown a robotic device 202 and a controller device 220 (e.g., a handheld device). The controller device 220 may include one or more buttons that may be pressed to effect one or more features of the controller device 220.

In one embodiment, a robotic point capture and motion control system may manipulate the orientation and position of the robotic device 202 based on inputs from the controller device 220, which may be controlled by a user. In other words, the orientation of the controller device 220 and other inputs on the controller device 220 may result in the robotic device 202 moving its one or more end effectors to a desired location. For example, a user who may hold the controller device 220 may vary the orientation and position of the controller device 220, in order to generate a respective orientation and position of the robotic device 202. In that sense, the user is capable of moving the controller device 220 in space, to cause a movement of the robotic device 202 end effectors from one point in space to another. A user may program the robotic device 202 by moving the controller device 220 through a desired path.

In one embodiment, a robotic point capture and motion control system may facilitate a training mode such that the controller device is capable of learning and capturing points in space at various locations being traversed using the controller device. The user may press the pressure sensitive trigger to gain control of the robot. The robot may be moved into the desired position and orientation of a point in space and then the trigger is released. A button is pressed on the controller device to add the point. Adding the point means that the point is recorded into the program for later execution in the execution mode. The robot may then be moved to subsequent positions and orientations where additional points are added. Buttons can be configured on the controller to manipulate various functions of the robot or end effector.

An example of an end effector may be a gripper on the robot such that the gripper is capable of gripping objects to be manipulated by the robot. A new point can be added to a given position that opens or closes the gripper at that position. It should be understood that an end effector may also be an attachment that could be attached to a part of the robot in order to perform a specific function. In robotics, an end effector is the device at the end of a robotic arm, designed to interact with the environment. The exact nature of this device depends on the application of the robot. For example, the end effector could be a welding attachment, a paint dispenser or sprayer, or any other type of attachment.

In one embodiment, a robotic point capture and motion control system may facilitate alteration of recorded points and/or addition of new points to be recorded. For example, a user is capable of scrolling to various recorded points and then pressing a button to modify or insert a point. The user is also capable of adjusting the robot to the desired position and add the point.

In one embodiment, the robotic point capture and motion control system may activate the robot control when the user presses the pressure-sensitive trigger on the controller device. For example, a point 204 may be defined at some predetermined distance (e.g., distance 206) from the end of the robot arm. When the user moves the controller device 220 upward, all axes of the robot move in a coordinated fashion so that the result is that the point moves upward in space. It should be understood that the distance traveled by the point 204 may be proportional to the distance traveled by the controller device 220. That is, if the user moves the controller device 220 upward by a distance D, the point 204 may also move upwards by a distance that may be proportional to the distance D. To activate the robot control, the user presses the pressure-sensitive trigger. Imagine a point defined some fixed distance from the end of the robot arm (see image below with red dot point). When the user moves the controller upward, all axes of the robot move in a coordinated fashion so that the result is that the point moves upward in space. The same is true for movements of the controller device 220 down, left, right, forward, and back. It should be understood that this type of movement is referred to as translation. That is translating the movement of the controller device 220 into movements of the robot device 202.

In one embodiment, the robotic point capture and motion control system may map the positions and orientations of the controller device 220 into robot coordinates, through direct Cartesian coordinate representation or through abstracted axis motion mapping.

In one embodiment, the robotic point capture and motion control system may generate an appropriate motion from the indicated input, and immediately direct the robotic device 202 to move towards a new final position. In another embodiment, the robotic point capture and motion control system may capture positions of the robotic device 202 when the user positions the controller device 220 in order to arrive at a desired location. The robotic point capture and motion control system may store these positions for future playback and adjustment.

In one embodiment, the controller device 220 may include navigation buttons that may be used to capture one or more points in space associated with a location of the robotic device 202. Further, the controller device 220 may include navigation buttons that may delete one or more points in space. The controller device 220 may include additional button and trigger buttons for performing other programming actions. It should be appreciated that the navigation buttons may be programmed based on a user preference and profile.

In one embodiment, the robotic point capture and motion control system may facilitate a plurality of robotic devices 202 to be controlled simultaneously using multiple controller devices 220. Consequently, motions may be performed in parallel and coordinated moves between two or more robotic devices 202 may be accomplished in real time using one or more controller devices 220.

In one embodiment, the robotic point capture and motion control system may facilitate pressure sensitive button control of the navigation buttons of the controller device 220. The pressure sensitive button control may be used to determine a range of motion generated by shifting positions and orientations from the controller device 220. This may allow the user to indicate the degree to which position and orientation changes will affect the robotic or motion control position. For example, by squeezing the trigger button fully, the robotic point capture and motion control system may generate a large motion. The robotic point capture and motion control system may generate small motions by releasing pressure from the trigger button. Fully releasing the trigger may disengage the robotic motion entirely. In another embodiment, engaging and disengaging motion can be accomplished by a button, a slider, or another tactile input device.

In one embodiment, the robotic point capture and motion control system may determine that completely releasing the trigger button may allow the controller device 220 to be moved to a new position in space before re-engaging control. This may allow a click and drag motion to be accomplished, enabling the user to move across large distances with very little effort. It should be understood that the controller device, the joystick on the controller device, and the trigger on the controller device control the robot in moving along axes, along planes, and rotationally in three dimensional space. In order to make the robot rotate, the user device may rotate the hand held controller device, or my use the joystick or the trigger to cause the robot to rotate in space. This means that the robot can be controlled not only in XYZ with the trigger, but also in roll, pitch, and yaw.

Referring to FIG. 2B, axis locking is shown such that a controller device 220 is able to rotate without affecting the orientation of the coordinate system of the robotic device 202. The orientation of the coordinate system of the robotic device 202 is shown in two dimension having direction 203 and direction 205 for simple illustration. However, it should be understood that although a two dimensional coordinate system is shown, three dimensional implementation may be envisioned.

In one embodiment, the controller device 220 may be rotated by a user moving their hand in space to align the controller device 220 to be parallel to the ground or perpendicular to the ground or any other orientation without affecting how the joystick is moved on the control device 220. That is, although the control device 220 may be in one orientation in space, pushing the joystick in the direction 205, causes the robotic device 202 to move in direction 205. Similarly pressing the joystick to move in direction 203, causes the robotic device 202 two move in direction 203.

In one embodiment, the controller device 220 may include a button that may be used to activate axis locking, in which the dominant direction of translation or rotation from the user is detected. When this axis of translation or rotation is detected, the robotic point capture and motion control system may lock out or freeze motion in all other axes, allowing control in this particular axis of motion without disturbing other directions. For example, in the case where the controller device 220 does not translate, but remains in the same XYZ position in space. When the user rotates the controller device 220 about the controller centroid, the robot device 202 moves all axes in a coordinated fashion so that the imaginary point remains in its own fixed point in space, but the end of the robot arm remains "pointed" at that imaginary point, and rotates about it. This means the robot can pitch up and down, yaw left or right, or remain pointed in the same direction, but rotate about the axis in the direction it is pointed.

Axis locking may be activated on global Cartesian axes (e.g., axes X, Y, Z) of the robotic device 202. This may allow locking the translations in the global X, Y, or Z axes, and may also allow locking the rotations about the global X, Y, or Z axes. Axis locking may also be accomplished with respect to local coordinates relative to the end effector of the robotic device 202. Consequently, local movements of the end effector may be mapped and controlled.

Further, axis locking may include the ability to map to a particular axis of the robotic device 202, allowing individual axes to be jogged while ignoring inverse kinematics (IK) mapping or Cartesian axes. For example, the robotic point capture and motion control system may determine the motion of the controller device 220 along the relative controller X axis, and the relative controller Z axis is translated into motion in the corresponding local axis X of the robotic device and the local axis Z of the robotic device. By engaging axis locking, motions in the dominant relative axis of the controller device 220 may be mapped directly to the corresponding local axis of the robotic device. It is understood that the above descriptions are for purposes of illustration and are not meant to be limiting.

FIGS. 3A and 3B depict a robotic point capture and motion control system, in accordance with one or more example embodiments of the present disclosure.

Referring to FIG. 3A, there is shown a control device 320 having one or more probes 310 attached to a connector 309 of the control device 320. A probe 310 may be a replica of an end effector of a robot, a point device, a tool, or any other suitable devices. In one example, the probe 310 may have a probe tip 312 that may be used to designate a point in space. That is, the probe tip 312 may be associated with a point and space that indicates coordinates. The coordinates of the probe tip 312 may indicate the location of the probe tip 312. The control device 320 may determine the coordinates of the probe tip 312 based on a profile associated with the probe 310 that may have been determined based on the type of the probe 310 used. The profile associated with probe 310 may include length of the probe 310 and positioning of the probe 310 when installed on the control device 320. The profile associated with the probe 310 may be inputted to the robotic point capture and motion control system during installation of the probe 310. The profile of the probe 310 may be sent to a base station (e.g., motion capture input device 123 of FIG. 1) to determine specific actions that may be performed by the robotic point capture and motion control system.

In one or more embodiments, the probe 310 may have an offset distance (e.g., distance d) from a location on the controller device 320. The controller device may be a position-sensing and orientation-sensing hand-held controller device. For example, the controller device 320 may contain circuitry comprising a sensor that can sense and capture the position and orientation of the control device relative to a coordinate system. The captured position and orientation may then be sent to the base station (e.g., motion capture input device 123 of FIG. 1) to keep track of where the control device is positioned and how it is oriented in space. For example, the base station is used to track the control device 320 absolute position and orientation in space. The controller device 320 may contain a sensor, which communicates with the base station to identify the controller device 320 position and orientation.

In one example, the offset distance d represents a distance between a point on the control device and the probe tip 312. The information sent from the control device 320 to the base station includes the offset distance. The information received at the base station may then be used to program a robot to perform actions by traversing through the captured points and orientations. The robot 302 may traverse paths that take into consideration the offset distance d. For example, the offset distance d may be measured from a point on the robot 302 (e.g., point 306) that is used to connect an end effector of the robot 302. In that case, the offset distance d may represent the length of the end effector. An example of that application may be when a welding attachment is used as an end effector. In another example, the offset distance d may be measured from a point on the end effector such that the end effector traverses through space while attached to the robot 302 and keeping a distance d from a surface. That is end effector attached to the robot 302 can traverse through the various points and orientations captured by the controller device 320 while keeping an offset distance d between the end effector the surface. This allows the robot arm to traverse through the various points and orientations by keeping a certain distance (e.g., the offset distance) from the surface.

It should be understood that the connector 309 may be a connector that can take a variety of attachments that may be associated with an end effector of a robotic device. For example, the connector 309 may take a specific attachment that may be similar or proportional to an attachment that goes on the end effector of a robotic device.

In one or more embodiments, a robotic point capture and motion control system may define offset motions for the robot to follow. In that case, the robot will mimic the orientation of the controller device 320—as the user is holding it—but the robot will not attempt to go to its location. This will permit the person to stand beside the robot or outside a safety enclosure and have the robot mimic the movements of the person. However, the orientation of the end effector is absolute with what the person is doing rather than relative. For example, a user holding the controller device 320 may a button on the controller device 320 in order to select this mode, or on a tablet may connected with the controller device 320. In this mode, the controller device 320 sends its data comprising its position and orientation to the base station, the base station communicates with the robot 302 to transmit that data to the robot 302. Further, the base station may implement this mode by executing an algorithm that comprises the robot 302 mimicking the controller device 320 within boundaries that may be assigned as parameters in this mode. These parameters may be defined by a user or a system administrator of the robotic point capture and motion control system.

In one embodiment, the operator may move the controller device 320 to make contact at a surface with the probe tip 312. This allows the robotic point capture and motion control system to teach the robot by capturing one or more points in space that may be defined for one or more purposes. For example, the operator may hold the controller device 320 by hand and may move the probe tip 312 onto one or more surfaces (e.g., planes, complex surfaces, cylinders, or any other surface) or even points in space that may define a space boundary. The operator may then press a trigger on the controller device 320 to capture (e.g., learn) the point and orientation of the probe 310 and the probe tip 312. The point and orientation may be stored for use in the robot program. For example, the controller device 320 may send the captured point and orientation of the probe 310 to the base station for processing.

In one embodiment, the distance between the probe tip and the sensor in the controller may be constant. In that case, the distance and the position and orientation of the controller device can be used to precisely calculate the position of the probe tip 312 in space. The controller device 320 may be held in any orientation as long as the tip of the probe is touching the point the operator would like to capture.

Referring to FIG. 3B, there is shown a controller device 320 and a cylinder 300.

Typically, a robot must be moved to the specified location and orientation to capture the desired point. This often means the operator must move the robot into a gross position and then make very slow, fine moves, to bring the robot into the exact orientation desired. Robotic applications require the operator to "teach", "program", or "capture" 3-dimensional points that serve as target points for robot motion.

In one embodiment, a robotic point capture and motion control system may facilitate capturing features external to the robot to use for aligning the robot, or even giving the robot an exact point or orientation to move to without ever actually moving the robot during the learning stage.

In one example, the operator may manipulate or move the controller device 320 such that the probe tip 312 may touch four points (e.g., points 332, 334, 336, and 338) on the circumference of the cylinder 300. The robotic point capture and motion control system may facilitate the capture of these points in order to define the circular surface of the cylinder 300. The controller device 320 may transmit these captured points to a motion capture input device 123 of FIG. 1, which in turn may communicate those points to a robotic device. An operator may then execute a robotic program in order to manipulate the robotic device to traverse the circular surface of the cylinder 300 based at least in part on the captured points (e.g., points 332, 334, 336, and 338).

In one embodiment, the robotic point capture and motion control system may determine the center 340 of the cylinder 300 based at least in part on the four points (e.g., points 332, three, 34, 336, and 338). The operator in this case does not need to point the probe tip 312 to the center of the cylinder. The system is able to deduce the center 340, based on the collected four points.

Although a cylinder 300 is given as an example, it should be understood that other shapes may be defined by one or more points in space that the controller device 320 is able to capture these shapes based on the one or more points in space. This allows the robot to traverse any surface (e.g., planes, complex surfaces, cylinders, or any other surface) by capturing the necessary points to define that shape. It should be understood also that the distance between the probe tip 312 and the sensor in the controller device 320 may be used as an offset to allow the robot to traverse any surface such that an attachment to the end effector of the robot may be proportional to the distance. This allows the operator to run the robot had a distance from the object without touching the object. It is understood that the above descriptions are for purposes of illustration and are not meant to be limiting.

FIGS. 4A and 4B depict a robotic point capture and motion control system, in accordance with one or more example embodiments of the present disclosure.

Referring to FIG. 4A, there is shown a controller device 420 that may be used, to capture (learn) one or more points in space (e.g., points 432, 434, and 436), in order to define a plane 400.

In one embodiment, the robotic point capture and motion control system may facilitate that and operator may capture three points (e.g., points 432, 434, and 436) and use the software to define a 3-dimensional plane, which can be used as a new coordinate system or "base." A base is defined as a translation for the global base and a rotation from the global coordinate system.

Referring to FIG. 4B, there is shown a software interface showing the capture of points associated with a particular plane in space. The robotic point capture and motion control system may use a control device 420 to capture "grab point" one or more points in space by pressing the trigger of the controller device 420 or by manually capturing the one or more points in space using the software interface or any other interface.

In one embodiment, the robotic point capture and motion control system may align the robot with any of the axis of the bases. There may be variations of these bases that can be used. For example, in a lathe chuck application, the operator may define four or more points around the outside diameter of the lathe chuck and then a point on the face of the lathe chuck. The robot can then be aligned with this base with a certain offset. This allows the robot to be instantly aligned with the lathe chuck for inserting cylindrical parts. Current methods would have the operator put a cylindrical part in the robot gripper, jog the robot into position, and painstakingly align it with the lathe chuck. It should be understood that this method may be used for aligning the robot with any cylindrical body. In a vice application, an operator may use the controller device 420 to define the jaws of the vice and specify which jaws are fixed and which are moveable. This allows the operator to align and center a part in the vice with the press of a button on the controller device 420, without having to move the robot during the learning stage. In picking up objects applications, the operator may select a point and orientation for picking up a part. Parts can then be scaled in an array so that the robot picks up a different part from a tray each time. The probe can be used to indicate the pitch of each part in the rows and columns of the array. In the example of assembly location, the operator may select a point and orientation for the robot to move to during the learning stage. During the execution stage, the robot may then move to that location when instructed to. In another example, an operator may select a plan and send commands so the robot orients perpendicular to the plane with a given offset. This allows the robot to be locked into a parallel "flight path" with the plan for performing operations like drawing, marking, or dispensing.

The robotic point capture and motion control system may define one or more paths for the robot to follow. For example, a user using the controller device 420 may traverse a path in space while holding a trigger of the controller device 420 during a "teaching" stage such that the controller device 420 may transmit signals comprising information related to the speed, orientation, and coordinates of the controller device for 20 at various points in the path in space. The signals may be received by the base station, which may be stored in a storage device for later use by the robot during an execution mode. The speed at which the user may have traverse the path may also be stored and used during the execution mode. For example, the speed of the robot after the "teaching" stage may match how fast the user traversed the path while holding the handheld controller device 420.

Further, the speed at which the user traversed the path may be compared to a threshold before allowing the robot to move at that same speed for safety measures. For example if the speed at which the user traversed the path was greater than the threshold, an adjustment may be made to the speed in order to bring the speed less than or equal to the threshold.

Another example may be defining a safety area. In this example, the operator may define a plane or portion of the 3D space of varying shapes using the probe that the robot will not violate with end effector or other portions of the robot. In other words, the robotic point capture and motion control system may facilitate the capture, during the learning stage, of one or more points in space in order to define a plane that may be used by the system to prevent parts of the robot from entering. One or more planes may be defined in order to create a safety area, or an operable area. This may prevent the operator from accidentally being impacted by any parts of the robot during execution of the program.

In one embodiment, the robotic point capture and motion control system may facilitate the operator to click using the handheld control device 420, an area in space (e.g., point and orientation) to which the robot will travel. That is, the operator may "summon" the robot to a specific point and orientation in space. It should be understood that this area in space should be in the area that does not violate the safety area that may have been previously defined. In this case, the operator then modulates the speed at which the robot travels to that point using the trigger of the control device 420. Currently summoning the robot is not available in any other robot programming method. The user may specify a position and orientation for the robot to go to, but the point and orientation must be clearly identified first. This is not practical under circumstances where the user cannot visualize the location of the point in space.

In one embodiment, the robotic point capture and motion control system may define a path along one or more points in space or on an object of various shapes, by placing the probe tip 412 of the controller device 420 on a work piece, then press a record button on the controller device 420 (or using a software interface), and then move the control device 420 along a desired path on the work piece, while the software continuously records the controller device 420 position and orientation. These recorded positions and orientations can then be used during the execution stage to move the robot through the same positions and orientations for applications such as robotic welding, painting, and materials dispensing.

Further, it may be conceivable to define limits for the robot while still "recording" positions. For example, a material is to be dispensed onto a flat surface (XY), the robotic point capture and motion control system may define a Z-offset that the robot would maintain over the surface XY, and use the probe to "draw" out the dispensing pattern. The program would ignore any variation of the probe in Z, and would only "learn" the XY positions of the probe. Having a Z-axis (or other axis) offset allows a person to define a path with a stylus and have the robot end effector trace the path, but not contact the surface. For example, dispensing gasket material on an oil pan for a car.

One or more benefits of using the robotic point capture and motion control system is that the operator may be able to move the robot either by simply moving the handheld controller device 420 in space either simultaneously or during an execution mode. Further, this enables the operator to continuously focus on the robot during programming without the need to search for buttons. Furthermore, the robotic point capture and motion control system does not require the operator to move the robot in order to capture a point, the operator may simply capture points with the control device 420, thus improving safety. The robotic point capture and motion control system is more intuitive because regions are selected in the real world and transferred to the robot virtual world.

Currently, with existing systems, the operator must position the robot by moving each of the individual robot points to reach the desired position. The operator can also move the robot by incrementing the X, Y, Z, A, B, and C parameters of the robots position. Further, the operator must continuously shift their attention between the teach pendant and the robot to select the appropriate button and monitor the robot as it moves. This is a very inefficient and unsafe mechanism to program and implement a robotic program.

In addition to teach pendants, there are a number of application-specific products, and collaborative robots (cobots) available which allow the operator to physically grasp the robot and move it to the desired teach points. The goal of these products is to make the programming process more intuitive, but there are limitations.

These tools are often application-specific which reduces the number of applications where the technology can be applied or makes the technology difficult to apply outside of its intended application. However, the robotic point capture and motion control system enables operators to program robots for a much wider set of applications.

Further, these tools require the operator to physically grasp the robot, which poses a safety risk if the technology fails, or the operator is not paying attention. The robotic point capture and motion control system enables the operator to stand at a safe distance from the robot. Additionally, the robotic point capture and motion control system may capture points without the need for the robot to be active which increases operator safety.

Although cobots are intuitive to program, they must adhere to safety regulations that limit their operating speed and payload capacity. This limits their applicability. The robotic point capture and motion control system enables a cobot-like experience to be applied to any robot, including robots which run much more quickly and are much larger. It is understood that the above descriptions are for purposes of illustration and are not meant to be limiting.

Figure 5A:
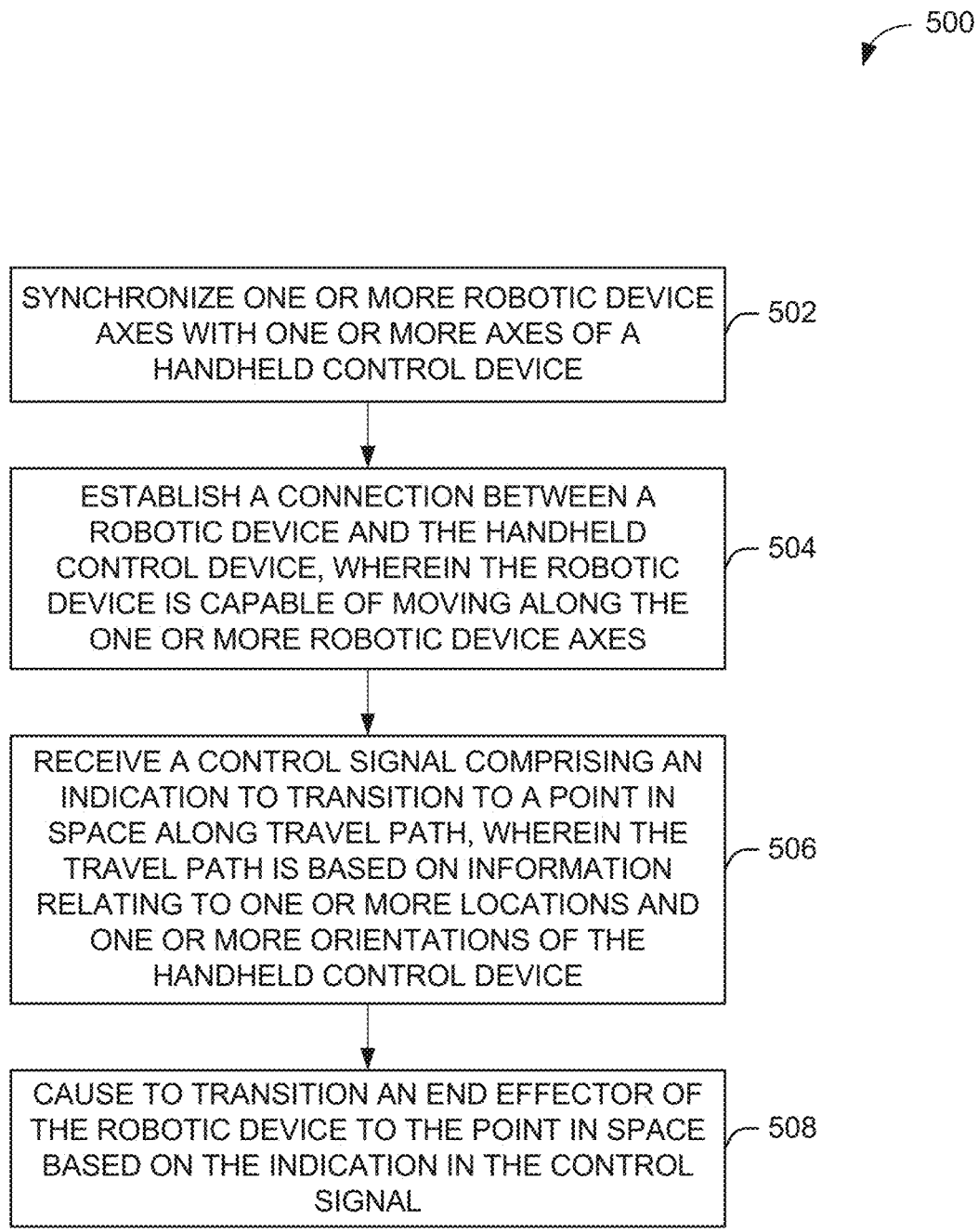
FIG. 5A depicts a flow diagram of an illustrative process for a robotic point capture and motion control system, in accordance with one or more example embodiments of the present disclosure.

FIG. 5A illustrates a flow diagram of illustrative process 500 for an illustrative robotic point capture and motion control system, in accordance with one or more example embodiments of the present disclosure.

At block 502, a robotic device (e.g., the robotic device(s) 120 of FIG. 1) may synchronize one or more robotic device axes with one or more axes of a handheld control device. The robotic device is at least one of an industrial robot, a drone, a humanoid robot, a robotic arm, a gantry robot (e.g., a computer numerical control (CNC) machine, a 3D printer, etc.) or any other device capable of moving along one or more axes. The robotic device may contain a base station (e.g., motion capture input device 123 of FIG. 1) or the base station may be a standalone device. The controller device 102 may communicate its position and orientation data to the base station. This maps the local orientation and position data into a coordinate system aligned (e.g., synchronized) with the robotic device's motion control system. The motion control system of the robotic device may comprise multiple axes of motion, controlled through a Cartesian coordinate system through an inverse kinematics mapping in one embodiment, or with each axis of motion controlled directly with no transformation mapping in another embodiment. Motion data from the controller device is transmitted to motion system associated with the robotic device through a robot communication interface. This interface can be any wired or wireless communication protocol used to send and receive motion information from the robot. The robot communication protocol may be a UDP message sent from the robot to the base station, with an expected reply containing the next required position to move to. The base station that have sensors that are around, the base station acts a beacon, so, any sensor around the base station would be able to determine its location relative to the base station. For example, a sensor could be installed on the controller device, another sensor on the robot, another sensor attached to a robot or attached to person's waist. In an optical method, multiple cameras may be positioned around an area or a cell, where the cameras are pointed to the area or the cell. One or more "dots" may be placed on a device or an object in the area or cell. The dots are then picked up by the cameras and a location of the object where the dots are attached is determined. For example, one or more dots may be placed on the end effector of the robot. The cameras then will know where the end effector location is by the cameras detecting the dots. The base station may also emit an alternating magnetic field, which is sensed by the handheld controller device. The field can be either a direct field or alternating field. Multiple base stations could be used to increase accuracy or reduce interference. It should be understood that other types of communications may be established between the robotic device, the base station, and the handheld controller device (e.g., optical, Wi-Fi, cellular, etc.)

At block 504, the robotic device may establish a connection between a robotic device and the handheld control device, wherein the robotic device is capable of moving along the one or more robotic device axes. In some examples, connection is at least one of an optical connection, a magnetic connection, or a wireless connection. The robotic device may use one or more methods of position and orientation capture. For example, the robotic device may "fuse" together one or more technologies to overcome weaknesses faced by other technologies. For example, optical techniques may provide higher accuracy than magnetic ones, but optical techniques are limited to line of sight operations. The robotic device system may use magnetic, optical, inertial measurement units (IMUs), and other techniques for capturing position and orientation in a robotic application concurrently and/or simultaneously. For example, optical techniques may be used in situations where line of sight is not limited, while other techniques such as magnetic or wireless may be used when line of sight is limited. The connection between the robotic device and the handheld control device establishes control of the robotic device using the handheld control device based on movements of the handheld control device in space. In some examples, tracking dots, or a "puck" with LED's may be placed on the handheld controller and on the end effector of the robot. The cameras track both objects and are able to understand the location and orientation of the objects in space. This allows robotic point capture and motion control system to get sub-millimeter precision.

At block 506, the robotic device may receive a control signal comprising an indication to transition to a point in space along travel path, wherein the travel path is based on information relating to one or more locations and one or more orientations of the handheld control device. In some examples, the robotic device may receive a second control signal comprising information associated with one or more restricted areas, wherein the one or more restricted areas are associated with one or more boundaries that at least one portion of the robotic device is restricted from crossing.

At block 508, the robotic device may cause to transition an end effector of the robotic device to the point in space based on the indication in the control signal. In some examples, the control signal may contain indication of the speed that the end effector should travel at. The robotic device may determine an end effector travel speed associated with transitioning the end effector of the robotic device along the travel path, and wherein the end effector travel speed (or the relative speed of the robotic device while trying to reach the point in space) is correlated to a speed of the handheld control device. In some embodiments, the robotic device may compare the end effector travel speed to a speed threshold. If the end effector travel speed is greater than the speed threshold, the robotic device may implement adjustments to the end effector travel speed in order to make it below the speed threshold. The speed of the end effector or the robotic device may match what the user did with their hand while traversing the controller device in space as long as the speed is within certain limits or the speed may be adjusted later.

The robotic device may also determine robotic device offset, wherein the robotic device offset is correlated to an offset of a probe attached to the handheld control device. For example, the control signal may comprise offset motions for the robotic device to follow. The robotic device may mimic the orientation of the handheld control device—as the user is holding it—but will not attempt to go to its location. This will permit the person to stand beside the robot or outside a safety enclosure and have the robot mimic the movements of the person.

It is understood that the above descriptions are for purposes of illustration and are not meant to be limiting.

Figure 5B:
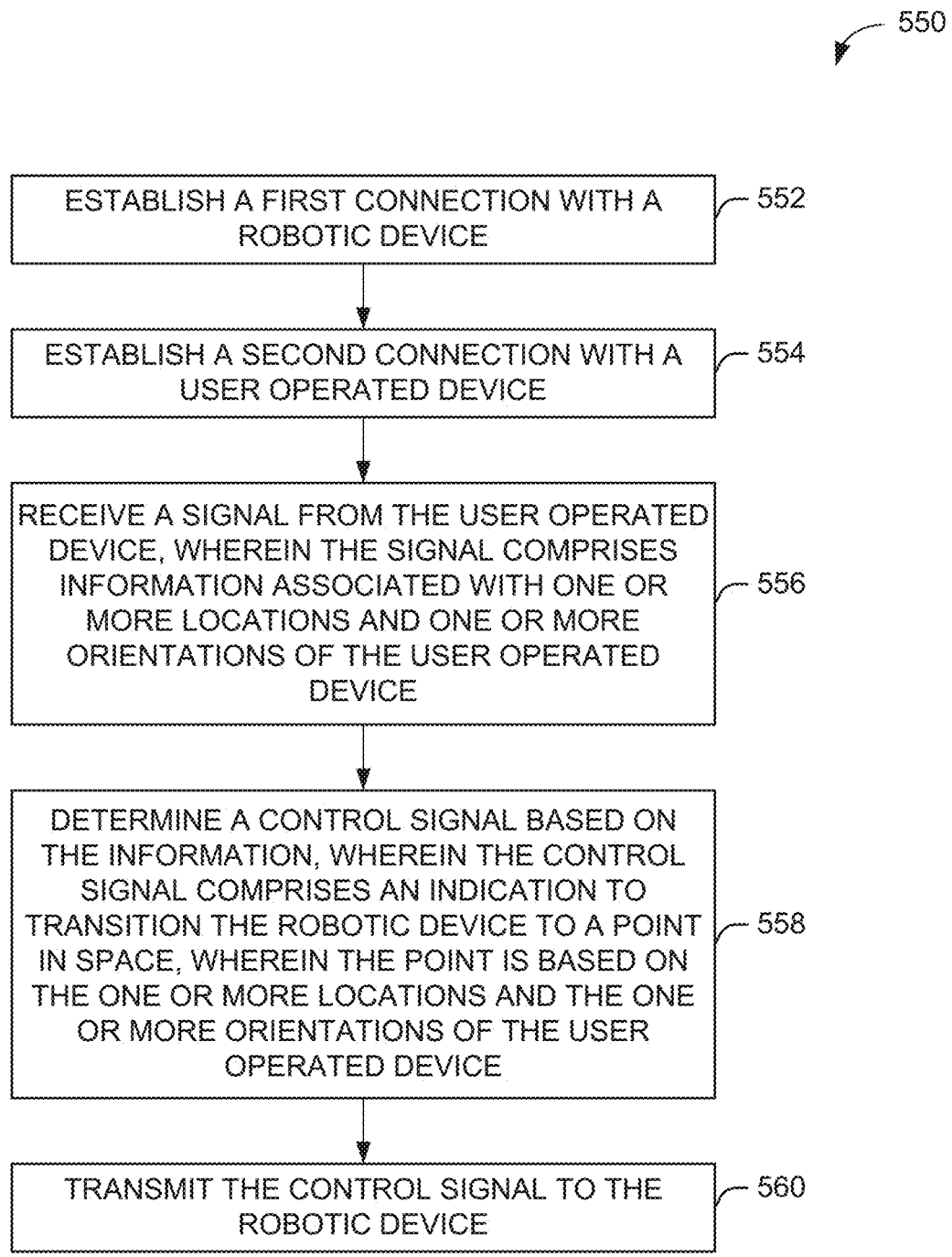
FIG. 5B depicts a flow diagram of an illustrative process for a robotic point capture and motion control system, in accordance with one or more example embodiments of the present disclosure.

FIG. 5B illustrates a flow diagram of illustrative process 550 for an illustrative robotic point capture and motion control system, in accordance with one or more example embodiments of the present disclosure.

At block 552, a device (e.g., a motion capture input device(s) 123 of FIG. 1) and/or the controller device(s) 102 of FIG. 1 may establish a first connection with a robotic device. The device, which may be a base station, may receive messages or otherwise signals from the robotic device and the controller device and may facilitate communications between the controller device and the robotic device. The device may also provide storage for various data points received from each of the robotic device and the controller device. For example, the controller device may send its location, orientation, and speed as the controller device traverses the 3D space to the device (e.g., the motion capture input device(s) 123 of FIG. 1). Similarly, the robotic device may transmit data associated with positioning, location, and speed of its end effector, as it is moving in 3D space. The device may also communicate with a user interface to display the captured data associated with the controller device and the robotic device. A user may interact with the user interface in order to modify, add, save, or delete any of the captured data.

At block 554, the device may establish a second connection with a user operated device. For example, the user operated device could be a handheld controller device (e.g., controller device(s) 102 of FIG. 1). The user operated device may be coupled to the device (e.g., the motion capture input device(s) 123 of FIG. 1) through various communication mechanisms such as magnetic, optical, wired, wireless, etc. The second connection between the device and the user operated device may allow exchange of data such as location data, orientation of the controller device, and speed of the controller device as the control device traverses 3D space.

At block 556, the device may receive a signal from the user operated device, where the signal includes information associated with one or more locations and one or more orientations of the user operated device. A user may trigger various points in 3D space by pressing a trigger or a button on the controller device. The controller device may include one or more buttons that may be pressed to cause the controller device to collect or save data associated with the location of the control device in 3D space. For example, the control device may lock its axis with the robotic device by pressing a certain button on the controller device. In this example, the user may then be able to traverse the control device in space to create and save actions that may then be sent to the base station. The base station may then use that information to cause the robotic device to perform one or more actions. For example to cause the robotic device to mimic the movements of the controller device as the user traverses the controller device in 3D space.

At block 558, the device may determine a control signal based on the information, wherein the control signal comprises an indication to transition the robotic device to a point in space, wherein the point is based on the one or more locations and the one or more orientations of the user operated device. For example, the indication may include information to orient at least one portion of the robotic device with a surface. The surface may be associated with the information in the signal received from the user operated device. The device may determine a travel path for an end effector of the robotic device based at least in part on one or more points based on the information, wherein the one or more points include a first point, a second point, and a third point the base station may determine a movement the end effector of the robotic device from the first point to the second point then to the third point.

At block 560, the device may transmit the control signal to the robotic device. The control signal may control the robotic device by causing it to perform actions. For example, the control signal may cause the end effector to move in space and then stop at the second point before transitioning to the third point. The control signal may cause the end effector to follow the points as portions of a spline. The base station may facilitate teaching of the robotic device using a robot orientation and path planning by selecting individual points in free space using the user operated device. In the execution mode, the robotic device may traverse from point to point based on the captured orientation and path of user operated device. The robotic device can come to rest at one point, or follow points as portions of a spline. The advantage is that the operator may teach entire paths or portions of paths without moving the robot by only moving the user operated device in 3D space. An example may be selecting individual points along a welding path. After these points are collected, the user operated device may then send that information to the base station which then uses one or more control signals to control the robotic device to perform the above movements. In some examples, the user operated device may send data that will allow the base station to record a path in free space as the user operated device moves in space. In execution mode, the robot may follow this path as a complete spline. An example may be teaching the robot how to spray paint a car by performing the actions using the user operated device and clicking certain buttons on the user operated device to capture data as the user operated device is traversing 3D space. It is understood that the above descriptions are for purposes of illustration and are not meant to be limiting.

FIG. 6 illustrates a block diagram of an example of a robotic machine 600 or system upon which any one or more of the techniques (e.g., methodologies) discussed herein may be performed. In other embodiments, the robotic machine 600 may operate as a stand-alone device or may be connected (e.g., networked) to other machines. In a networked deployment, the robotic machine 600 may operate in the capacity of a server machine, a client machine, or both in server-client network environments. In an example, the robotic machine 600 may act as a peer machine in peer-to-peer (P2P) (or other distributed) network environments. The robotic machine 600 may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

Certain embodiments may be implemented in one or a combination of hardware, firmware, and software. Other embodiments may also be implemented as program code or instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the robotic machine 600 may include one or more processors and may be configured with program code instructions stored on a computer-readable storage device memory. Program code and/or executable instructions embodied on a computer-readable medium may be transmitted using any appropriate medium including, but not limited to, wireless, wireline, optical fiber cable, RF, etc., or any suitable combination of the foregoing. Program code and/or executable instructions for carrying out operations for aspects of the disclosure may be written in any combination of one or more programming languages, including an object-oriented programming language such as Java, Smalltalk, C++ or the like, and conventional procedural programming languages, such as the "C" programming language or similar programming languages. The program code and/or executable instructions may execute entirely on a device, partly on the device, as a stand-alone software package, partly on the device and partly on a remote device or entirely on the remote device or server.

The robotic machine 600 may include at least one hardware processor 602 (e.g., a central processing unit (CPU), a graphics processing unit (GPU), a hardware processor core, or any combination thereof), a main memory 604, and a static memory 606. The robotic machine 600 may include drive circuitry 618. The robotic machine 600 may further include an inertial measurement device 632, a graphics display device 610, an alphanumeric input device 612 (e.g., a keyboard), and a user interface (UI) navigation device 614 (e.g., a mouse). In an example, the graphics display device 610, the alphanumeric input device 612, and the UI navigation device 614 may be a touch screen display. The robotic machine 600 may additionally include a storage device 616, a robotic point capture and motion control device 619, a network interface device/transceiver 620 coupled to antenna(s) 630, and one or more sensors 628. The robotic machine 600 may include an output controller 634, such as a serial (e.g., universal serial bus (USB), parallel, or other wired or wireless (e.g., infrared (IR), near field communication (NFC), etc.) connection to communicate with or control one or more peripheral devices. These components may couple and may communicate with each other through an interlink (e.g., bus) 608. Further, the robotic machine 600 may include a power supply device that is capable of supplying power to the various components of the robotic machine 600. Other components may be included, such as, lights or display on a controller device (e.g., the controller device 102 of FIG. 1), and other modes of point capture (e.g., 2D scanner, vision system, alternating magnetic field, etc.).

The drive circuitry 618 may include a motor driver circuitry that operates various motors associated with the axes of the robotic machine 600. Motors may facilitate the movement and positioning of the robotic machine 600 around the respective axes for a plurality of degrees of freedom (e.g., X, Y, Z, pitch, yaw, and roll). The motor driver circuitry may track and modify the positions around the axes by affecting the respective motors.

The inertial measurement device 632 may provide orientation information associated with a plurality of degrees of freedom (e.g., X, Y, Z, pitch, yaw, roll, roll rate, pitch rate, yaw rate) to the hardware processor 602. The hardware processor 602 may in turn analyze the orientation information and generate, possibly using both the orientation information and the encoder information regarding the motor shaft positions, control signals for each motor. These control signals may, in turn, be communicated to motor amplifiers to independently control motors to impart a force on the system to move the system. The control signals may control motors to move a motor to counteract, initiate, or maintain rotation.

The hardware processor 602 may be capable of communicating with and independently sending control signals to a plurality of motors associated with the axes of the robotic machine 600.

The storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the robotic machine 600. In an example, one or any combination of the hardware processor 602, the main memory 604, the static memory 606, or the storage device 616 may constitute machine-readable media.

The antenna(s) 630 may include one or more directional or omnidirectional antennas, including, for example, dipole antennas, monopole antennas, patch antennas, loop antennas, microstrip antennas, or other types of antennas suitable for the transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

The robotic point capture and motion control device 619 may carry out or perform any of the operations and processes (e.g., the processes 500 and 550) described and shown above. For example, the robotic point capture and motion control device 619 may enable the capturing of one or more points in space associated with a handheld controller device without having to move the robot to the one or more points in space during programming.

The robotic point capture and motion control device 619 may include a wireless controller device or a wired controller device (e.g., a handheld device) communicating the position and the orientation data to a motion capture input device, which maps the local orientation and position data into a coordinate system aligned with the robot or motion control system of the robot. The motion control system of the robot may comprise multiple axes of motion, controlled through a Cartesian coordinate system through an inverse kinematics mapping in one embodiment, or with each axis of motion controlled directly with no transformation mapping in another embodiment. Motion data from the controller device is transmitted to motion system associated with the robot through a robot communication interface. This interface can be any wired or wireless communication protocol used to send and receive motion information from the robot. In one embodiment, the robot communication protocol may be a UDP message sent from the robot to the motion capture input device, with an expected reply containing the next required position to move to.

The robotic point capture and motion control device 619 may facilitate controlling the robot motion based on a hand gesture while holding the controller device. For example, a user may hold the controller device and may move his or her hand such that the robot moves in the same direction as the hand gesture. That is, the robot may follow the controller device's movement direction regardless of the controller device's orientation and with a speed that is proportional to the amount of force applied to the trigger. This allows the user to program the robot very quickly and intuitively.

The robotic point capture and motion control device 619 may facilitate a single point and orientation capture in 3D space using a handheld controller and touch probe. The touch probe may allow capturing of one or more points and orientations in the 3D space.

The robotic point capture and motion control device 619 may facilitate the creation of one or more planes, points, or axes based at least in part on capturing of points and orientations in 3D space using the handheld controller and the touch probe.

The robotic point capture and motion control device 619 may allow the operator to very quickly align the robot with various physical elements (e.g., surfaces, point on a work piece, points in space, etc.). Current methods of alignment require slow jogging using a pendant to position the robot.

In one embodiment, a robotic point capture and motion control system may facilitate the ability to prevent a robot from moving past "keepout" planes or regions, which are defined using planes, captured above. Adding "keepout areas" by defining those areas in the real world via a position recording device allows for the robot programmer to not hit any objects while programming. This feature, is not available in any other robot programming methods.

The robotic point capture and motion control device 619 may facilitate a robot teaching using a robot orientation and path planning by selecting individual points in free space using the controller. In play mode, the robot may traverse from point to point based on the captured orientation and path. The robot can come to rest at one point, or follow points as portions of a spline. The advantage is that the operator may teach entire paths or portions of paths without moving the robot. An example may be selecting individual points along a welding path.

The robotic point capture and motion control device 619 may use one or more methods of position and orientation capture. For example, the robotic point capture and motion control system may "fuse" together one or more technologies to overcome weaknesses faced by other technologies. For example, optical techniques may provide higher accuracy than magnetic ones, but optical techniques are limited to line of sight operations. The robotic point capture and motion control system may use magnetic, optical, inertial measurement units (IMUs), and other techniques for capturing position and orientation in a robotic application concurrently and/or simultaneously. In some examples, tracking dots, or a "puck" with LED's may be placed on the handheld controller and on the end effector of the robot. The cameras track both objects and are able to understand the location and orientation of the objects in space. This allows robotic point capture and motion control system to get sub-millimeter precision.

The robotic point capture and motion control device 619 may facilitate robot teaching using a robot orientation and path planning by "recording" a path in free space using the controller. In play mode, the robot may follow this path as a complete spline. An example may be teaching the robot how to spray paint a car.

The robotic point capture and motion control device 619 may facilitate the ability to "call" the robot to a specific position based on a single position and orientation reading from the hand-held controller. The user may select the position in free space, then may move out of the way, and then initiates the robot's move to the selected position by modulating the speed with the trigger on the controller.

The robotic point capture and motion control device 619 may visually illustrate the points of a robot program on a user interface by showing a 3D image of the robot moving to each point as the user scrolls through points. The point path may also be shown as a spline.

It is understood that the above are only a subset of what the robotic point capture and motion control device 619 may be configured to perform and that other functions included throughout this disclosure may also be performed by the robotic point capture and motion control device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random-access memory (RAM), magnetic disk storage media; optical storage media' a flash memory, etc.

The term "machine-readable medium" may include any medium that is capable of storing, encoding, or carrying instructions for execution by the robotic machine 600 and that cause the robotic machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, and peer-to-peer (P2P) networks, among others. In an example, the network interface device/transceiver 620 may include one or more physical jacks (e.g., Ethernet, coaxial, or phone jacks) or one or more antennas (e.g., antennas 630) to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the robotic machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

The following examples pertain to further embodiments.

Example 1 may include a device comprising memory and processing circuitry configured to: synchronize one or more robotic device axes with one or more axes of a handheld control device; establish a connection between a robotic device and the handheld control device, wherein the robotic device may be capable of moving along the one or more robotic device axes; receive a control signal comprising an indication to transition to a point in space along travel path, wherein the travel path may be based on information relating to one or more locations and one or more orientations of the handheld control device; cause to transition an end effector of the robotic device to the point in space based on the indication in the control signal.

Example 2 may include the device of example 1 and/or some other example herein, wherein the memory and the processing circuitry are further configured to receive a second control signal comprising information associated with one or more restricted areas, wherein the one or more restricted areas are associated with one or more boundaries that at least one portion of the robotic device may be restricted from crossing.

Example 3 may include the device of example 1 and/or some other example herein, wherein the memory and the processing circuitry are further configured to determine an end effector travel speed associated with transitioning the end effector of the robotic device along the travel path, and wherein the end effector travel speed may be correlated to a speed of the handheld control device.

Example 4 may include the device of example 3 and/or some other example herein, wherein to cause to transition an end effector of the robotic device to the point in space further comprises to determine the end effector travel speed may be below a speed threshold.

Example 5 may include the device of example 3 and/or some other example herein, wherein to cause to transition an end effector of the robotic device to the point in space further comprises to adjust the end effector travel speed based on the end effector travel speed being above a speed threshold.

Example 6 may include the device of example 1 and/or some other example herein, wherein the connection may be at least one of an optical connection, a magnetic connection, or a wireless connection.

Example 7 may include the device of example 1 and/or some other example herein, wherein the connection between the robotic device and the handheld control device establishes control of the robotic device using the handheld control device based on movements of the handheld control device in space.

Example 8 may include the device of example 1 and/or some other example herein, wherein the memory and the processing circuitry are further configured to determine robotic device offset, wherein the robotic device offset may be correlated to an offset of a probe attached to the handheld control device.

Example 9 may include the device of example 1 and/or some other example herein, wherein the robotic device may be at least one of an industrial robot, a drone, a humanoid robot, or a robotic arm.

Example 10 may include a non-transitory computer-readable medium storing computer-executable instructions which when executed by one or more processors result in performing operations comprising: establish a first connection with a robotic device; establish a second connection with a user operated device; receive a signal from the user operated device, wherein the signal comprises information associated with one or more locations and one or more orientations of the user operated device; determine a control signal based on the information, wherein the control signal comprises an indication to transition the robotic device to a point in space, wherein the point may be based on the one or more locations and the one or more orientations of the user operated device; and transmit the control signal to the robotic device.

Example 11 may include the non-transitory computer-readable medium of example 10 and/or some other example herein, wherein the indication comprises orienting at least one portion of the robotic device with a surface, wherein the surface may be associated with the information in the signal received from the user operated device.

Example 12 may include the non-transitory computer-readable medium of example 10 and/or some other example herein, wherein the one or more locations and one or more orientations of the user operated device are associated with current one or more locations and current one or more orientations of the user operated device, or with previously stored one or more locations and previously stored one or more orientations of the user operated device.

Example 13 may include the non-transitory computer-readable medium of example 10 and/or some other example herein, wherein the operations further comprise: determining a travel path for an end effector of the robotic device based at least in part on one or more points based on the information, wherein the one or more points include a first point, a second point, and a third point; and determining a movement the end effector of the robotic device from the first point to the second point then to the third point.

Example 14 may include the non-transitory computer-readable medium of example 13 and/or some other example herein, wherein the operations for determining to move the end effector further include the operations for causing the end effector to stop at the second point before transitioning to the third point.

Example 15 may include the non-transitory computer-readable medium of example 13 and/or some other example herein, wherein the operations for determining to move the end effector further include the operations for causing the end effector to follow the points as portions of a spline.

Example 16 may include a method comprising: synchronizing, by one or more processors on a robotic device, one or more robotic device axes with one or more axes of a handheld control device; establishing a connection between the robotic device and the handheld control device, wherein the robotic device may be capable of moving along the one or more robotic device axes; receiving a control signal comprising an indication to transition to a point in space along travel path, wherein the travel path may be based on information relating to one or more locations and one or more orientations of the handheld control device; causing to transition an end effector of the robotic device to the point in space based on the indication in the control signal.

Example 17 may include the method of example 16 and/or some other example herein, further comprising receiving a second control signal comprising information associated with one or more restricted areas, wherein the one or more restricted areas are associated with one or more boundaries that at least one portion of the robotic device may be restricted from crossing.

Example 18 may include the method of example 16 and/or some other example herein, further comprising receiving determining an end effector travel speed associated with transitioning the end effector of the robotic device along the travel path, and wherein the end effector travel speed may be correlated to a speed of the handheld control device.

Example 19 may include the method of example 18 and/or some other example herein, wherein causing to transition an end effector of the robotic device to the point in space further comprises determining the end effector travel speed may be below a speed threshold.

Example 20 may include the method of example 18 and/or some other example herein, wherein causing to transition an end effector of the robotic device to the point in space further comprises adjusting the end effector travel speed based on the end effector travel speed being above a speed threshold.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a single input single output (SISO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations. Certain aspects of the disclosure may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system."

The computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A robotic device, the robotic device comprising memory and processing circuitry configured to:
  synchronize one or more robotic device axes with one or more axes of a handheld control device;
  establish a connection between the robotic device and the handheld control device, wherein the robotic device is capable of moving along the one or more robotic device axes;
  receive a control signal comprising an indication to transition to a point in space along travel path, wherein the travel path is based on information relating to one or more locations and one or more orientations of the handheld control device;
  cause to transition an end effector of the robotic device to the point in space based on the indication in the control signal; and
  determine an end effector travel speed associated with transitioning the end effector of the robotic device along the travel path, and wherein the end effector travel speed is correlated to a speed of the handheld control device, wherein to cause to transition an end effector of the robotic device to the point in space further comprises to adjust the end effector travel speed based on the end effector travel speed being above a speed threshold.

2. The robotic device of claim 1, wherein the memory and the processing circuitry are further configured to receive a second control signal comprising information associated with one or more restricted areas, wherein the one or more restricted areas are associated with one or more boundaries that at least one portion of the robotic device is restricted from crossing.

3. The robotic device of claim 1, wherein to cause to transition an end effector of the robotic device to the point in space further comprises to determine the end effector travel speed is below a speed threshold.

4. The robotic device of claim 1, wherein the connection is at least one of an optical connection, a magnetic connection, or a wireless connection.

5. The robotic device of claim 1, wherein the handheld control device comprises a probe, wherein the probe is a replica of the end effector of the robotic device.

6. The robotic device of claim 1, wherein the memory and the processing circuitry are further configured to determine robotic device offset, wherein the robotic device offset is correlated to an offset of a probe attached to the handheld control device.

7. The robotic device of claim 1, wherein the robotic device is at least one of an industrial robot, a drone, a humanoid robot, or a robotic arm, gantry.

8. A non-transitory computer-readable medium storing computer-executable instructions which when executed by one or more processors result in performing operations comprising:
  establish a first connection with a robotic device;
  establish a second connection with a user operated device;
  receive a signal from the user operated device, wherein the signal comprises information associated with one or more locations and one or more orientations of the user operated device;
  determine a control signal based on the information, wherein the control signal comprises an indication to transition the robotic device to a point in space, wherein the point is based on the one or more locations and the one or more orientations of the user operated device;
  transmit the control signal to the robotic device; and
  determine a travel speed associated with transitioning the robotic device along a travel path, and wherein the end effector travel speed is correlated to a speed of the user operated device, wherein to cause to transition the robotic device to the point in space further comprises to adjust the end effector travel speed based on the end effector travel speed being above a speed threshold.

9. The non-transitory computer-readable medium of claim 8, wherein the indication comprises orienting at least one portion of the robotic device with a surface, wherein the surface is associated with the information in the signal received from the user operated device.

10. The non-transitory computer-readable medium of claim 8, wherein the one or more locations and one or more orientations of the user operated device are associated with current one or more locations and current one or more orientations of the user operated device, or with previously stored one or more locations and previously stored one or more orientations of the user operated device.

11. The non-transitory computer-readable medium of claim 8, wherein the operations further comprise:
   determining a travel path for an end effector of the robotic device based at least in part on one or more points based on the information, wherein the one or more points include a first point, a second point, and a third point; and
   determining a movement the end effector of the robotic device from the first point to the second point then to the third point.

12. The non-transitory computer-readable medium of claim 11, wherein the operations for determining to move the end effector further include the operations for causing the end effector to stop at the second point before transitioning to the third point.

13. The non-transitory computer-readable medium of claim 11, wherein the operations for determining to move the end effector further include the operations for causing the end effector to follow the points as portions of a spline.

14. A method comprising:
   synchronizing, by one or more processors on a robotic device, one or more robotic device axes with one or more axes of a handheld control device;
   establishing a connection between the robotic device and the handheld control device, wherein the robotic device is capable of moving along the one or more robotic device axes;
   receiving a control signal comprising an indication to transition to a point in space along travel path, wherein the travel path is based on information relating to one or more locations and one or more orientations of the handheld control device;
   causing to transition an end effector of the robotic device to the point in space based on the indication in the control signal; and
   determining an end effector travel speed associated with transitioning the end effector of the robotic device along the travel path, and wherein the end effector travel speed is correlated to a speed of the handheld control device, wherein causing to transition an end effector of the robotic device to the point in space further comprises adjusting the end effector travel speed based on the end effector travel speed being above a speed threshold.

15. The method of claim 14, further comprising receiving a second control signal comprising information associated with one or more restricted areas, wherein the one or more restricted areas are associated with one or more boundaries that at least one portion of the robotic device is restricted from crossing.

16. The method of claim 14, wherein causing to transition an end effector of the robotic device to the point in space further comprises determining the end effector travel speed is below a speed threshold.

* * * * *